United States Patent [19]

Kratz et al.

[11] 4,191,993
[45] Mar. 4, 1980

[54] INVERTER COMPRISING AT LEAST TWO CONTROLLABLE LOAD THYRISTORS

[75] Inventors: Gerhard Kratz, Erlangen; Werner Kuehnel, Uttenreuth, both of Fed. Rep. of Germany

[73] Assignee: Siemens Aktiengesellschaft, Berlin & Munich, Fed. Rep. of Germany

[21] Appl. No.: 943,067

[22] Filed: Sep. 18, 1978

[30] Foreign Application Priority Data

Oct. 13, 1977 [DE] Fed. Rep. of Germany ....... 2746099

[51] Int. Cl.$^2$ ........................................ H02M 7/515
[52] U.S. Cl. ..................................... 363/135; 363/138
[58] Field of Search ................. 363/27, 135, 136, 137, 363/138; 307/252 M

[56] References Cited

U.S. PATENT DOCUMENTS

| Re. 27,193 | 10/1971 | Risberg | 363/138 |
| 3,207,974 | 9/1965 | McMurray | 363/136 |
| 3,710,215 | 1/1973 | Johnston | 363/138 X |
| 3,781,645 | 12/1973 | Grom et al. | 363/138 |
| 3,928,794 | 12/1975 | Broms et al. | 363/27 |

*Primary Examiner*—William M. Shoop
*Attorney, Agent, or Firm*—Hill, Van Santen, Steadman, Chiara & Simpson

[57] ABSTRACT

The disclosure relates to an inverter comprising at least two controllable load thyristors which connect a load alternately with the poles of a feed d.c. voltage source. There is connected in parallel with each load thyristor one diode each which is a component of a commutation installation. The commutation installation manifests an LC-series oscillatory circuit dimensioned for a specified load current, and, manifests, for each load thyristor a controllable commutation thyristor which forms a closed circuit with the LC-series oscillatory circuit and its diode. The LC-series oscillatory circuit is connected to an auxiliary d.c. voltage source of a constant voltage via a reloading circuit.

5 Claims, 2 Drawing Figures

INVERTER COMPRISING AT LEAST TWO CONTROLLABLE LOAD THYRISTORS

BACKGROUND OF THE INVENTION

The invention relates to an inverter comprising at least two controllable load thyristors to which a control device is connected which alternately switches them on for the purpose of alternate connection of a load to the poles of a d.c. voltage source, wherein there is connected, in antiparallel fashion, with each load thyristor, one diode each which is a component of a commutation installation for the corresponding load thyristor, which commutation installation manifests an LC-series oscillatory (or resonant circuit) dimensioned for a specified load current, and which manifests, for each load thyristor, a controllable commutation thyristor connected to the control device, whereby each commutation thyristor forms a closed circuit with the LC-series oscillatory circuit and its diode, such that the energy of the LC-series oscillatory circuit, during commutation, in each instance changes over to a low-impedance (or low-ohmic) commutation path which is free of the load and the d.c. voltage source.

SUMMARY OF THE INVENTION

The object underlying the invention consists in constructing an inverter of the type initially cited such that the maximum commutation current does not increase beyond a value which is required with regard to the maximum load current.

In accordance with the invention, this object is achieved by virtue of the fact that the LC-series oscillatory circuit is connected via a re-loading circuit to an auxiliary d.c. voltage source of a constant voltage, which is independent of the feed d.c. voltage source, and that the reloading circuit limits the maximum capacitor voltage to the voltage of the auxiliary d.c. voltage source. In the case of the inventive inverter, the maximum capacitor voltage is equal to the voltage of the auxiliary d.c. voltage source. Since this voltage determines the maximum commutation current, it is possible to limit the maximum commutation current to the highest required value through a suitable selection of the voltage of the auxiliary d.c. voltage source. The maximum commutation current, namely, no longer increases when there is an increasing voltage of the feed d.c. voltage source.

The invention shall be explained in greater detail on the basis of a sample embodiment illustrated in FIG. 2; and other objects, features and advantages will be apparent from this detailed disclosure and from the appended claims.

DETAILED DESCRIPTION

Figure 1:
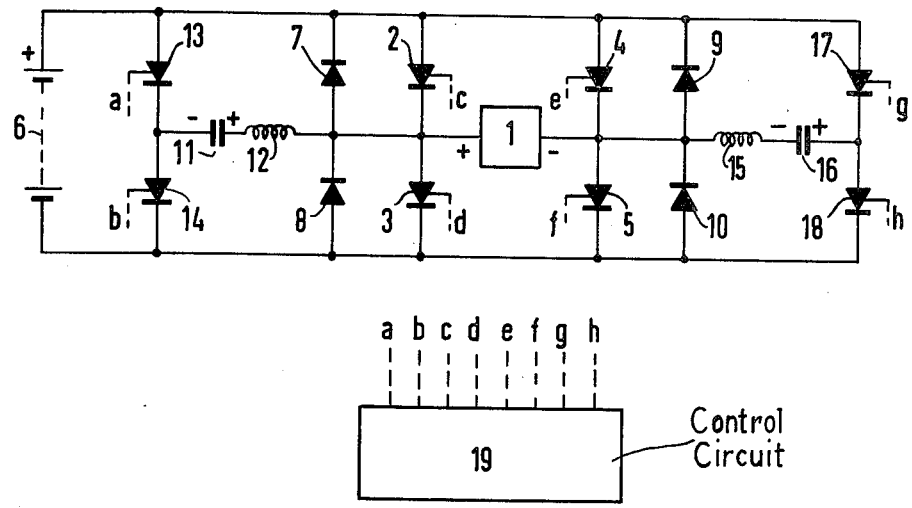
FIG. 1 is an electric circuit diagram showing a known type of inverter circuit.

In FIG. 1, an inverter of the type referred to, e.g. known from the German Auslegeschrift No. 14 38 446, is illustrated. It exhibits a load 1 which is disposed in one diagonal of a bridge of load thyristors 2 through 5. The other diagonal of this bridge is connected to a d.c. voltage source 6. One diode 7 through 10 is in each instance connected in an antiparallel fashion to each load thyristor 2 through 5, said respective diode being a component of a commutation installation for the corresponding load thyristor. In order to effect commutation of load thyristors 2 and 3, there is present an LC-series oscillatory circuit 11, 12, which is connected to the connection point of diode 7 and 8, on the one hand, and to the connection point of the two commutation thyristors 13 and 14, on the other hand. Analogously thereto, for the purpose of commutation of load thyristors 4 and 5, an LC-series oscillatory circuit 15, 16, is connected between the connection points of diodes 9 and 10 and the connection point of two commutation thyristors 17 and 18. The load thyristors 2 through 5 and the commutation thyristors 13, 14, 17, 18, are connected to a common control device 19.

In order to explain the method of operation of the inverter according to FIG. 1, let it be initially assumed that capacitors 11 and 16 of the LC-series oscillatory circuits 11, 12 and 15, 16, are charged with the indicated polarities and that the load thyristors 2 and 5 are ignited via the control device 19. The load 1 is thereby connected to the voltage source 6 with the indicated polarities. In order to preserve the polarity of the voltage at load 1, load thyristors 2 and 5 must be quenched (or extinguished) and the load thyristors 3 and 4 must be ignited. To this end, an ignition pulse is initially delivered to the commutation thyristors 13 and 18 via control device 19. Subsequent to ignition of the commutation thyristors 13 and 18, the capacitors 11 and 16 are reserved in charge; that is, first via load 1 and d.c. voltage source 6. The charge reversal current here replaces the current flowing through load thyristors 2 and 5. Since the load current through load 1 is constant, load thyristors 2 and 5 and thus extinguished. Following the quenching of these thyristors, the charge reversal current flows further via diodes 7 and 10 until capacitors 11 and 16 are charged to a voltage having the opposite polarity of the voltage illustrated in FIG. 1. Following termination of the charge reversal operation, commutation thyristors 13 and 18 are quenched.

Briefly prior to this, load thyristors 3 and 4 may be ignited by means of control device 19 through the delivery of ignition pulses. In order to quench load thyristors 3 and 4, commutation thyristors 14 and 17 are ignited, whereby the capacitors 11 and 16 again undergo a charge reversal corresponding to the above-described method of operation. In so doing, load thyristors 3, 4, are quenched. Subseqently, load thyristors 2 and 5 are again ignited, etc. In the case of the prior art inverter according to FIG. 1, the LC-series oscillatory circuits must be dimensioned corresponding to the load current, since they must, of course, take over the latter for a brief period. There are areas of application for an inverter of this type wherein the load current is not constant. Such a field of application is, for example, X-ray technology. In this technology, an inverter according to FIG. 1 can serve the purpose of feeding the high voltage transformer of an X-ray generator. In this instance, the d.c. voltage source 6 may either be a mains (or power) rectifier or an accumulator. The feeding of the high voltage transformer can proceed with a frequency lying substantially above the mains (or supply) frequency, e.g. a frequency of 4 KHz, such that the high voltage transformer, in comparison with X-ray generators directly fed by the mains supply, can be provided with a substantially more lightweight and smaller construction.

In utilizing the inverted rectifier according to FIG. 1 in an X-ray generator for the purpose of feeding the high voltage transformer, it is necessary that the X-ray tube voltage be adjustable. To this end, the voltage of the feed d.c. voltage source 6 can be adjustable. In this applied instance, as a rule, the maximum possible load current is greater, the smaller the voltage of the feed d.c. voltage source 6. Thus, in the case of nearly the smallest input voltage of the inverter according to FIG. 1, the greatest load current occurs. Since the maximum commutation current is dependent upon the maximum value of the load current, the commutation circuit must be dimensioned such that the maximum commutation current flows in the case of the smallest input voltage. In the case of an inverter according to FIG. 1, this means that, when the input voltage increases, the maximum commutation current likewise increases, although, in view of the decreasing load current, this would not be necessary. In the inverter according to FIG. 1, in the field of application described, the components of the commutation circuits are thus to be dimensioned for a comparatively high maximum commutation current which occurs only in the case of the maximum input voltage.

Figure 2:
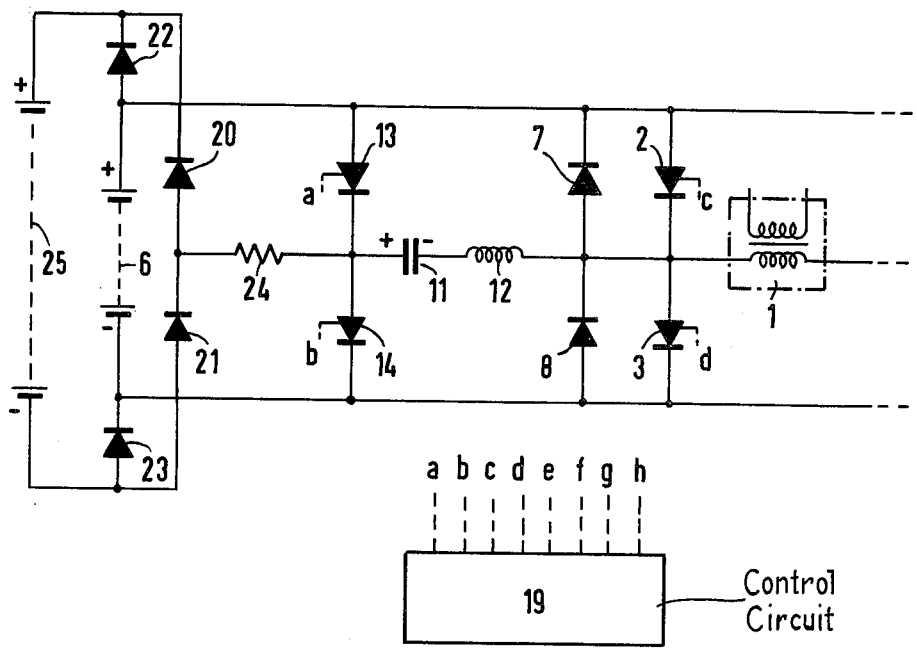
FIG. 2 is a similar electric circuit diagram illustrating a corresponding inverter circuit in accordance with the teachings of the present invention.

In FIG. 2, only the left phase-module of an inverter in a bridge circuit is illustrated. Parts which are identical to parts of the inverter according to FIG. 1 are designated with the same reference signs.

From FIG. 2, it is apparent that the connection point of capacitor 11 with the commutation thyristors 13, 14, is connected to a reloading circuit consisting of four diodes 20 through 23 and a resistance 24. The reloading circuit 20 through 24 is connected to an auxiliary d.c. voltage source 25 whose voltage is constant.

For explaining the mode of operation of the reloading circuit in the case of the inverter according to FIG. 2, let it be assumed that the capacitor 11 is charged to a voltage of the indicated polarity which voltage, due to several reloading (or recharging) operations, has shifted up to a value which lies above the voltage of the auxiliary d.c. voltage source 25. In the case, a compensating current flows from the positive electrode of capacitor 11 via the resistance 24, the diode 20, the auxiliary d.c. voltage source 25, the diodes 23 and 8, or the ignited load thyristor 3, and the inductance 12 to the negative electrode of capacitor 11, such that the voltage at capacitor 11 is reduced to a value which is equal to the voltage of the auxiliary d.c. voltage source 25. In the case of an opposite polarity of the voltage at capacitor 11, there takes place a voltage compensation via inductance 12, diode 7, or the ignited load thyristor 2, respectively, the diode 22, the auxiliary d.c. voltage source 25, diode 21, and resistance 24.

The voltage of the auxiliary d.c. voltage source 25 is dimensioned such that the maximum commutation current lies sufficiently above the load current; i.e., that the load thyristors 2, 3, are reliably quenched (or extinguished). This voltage is expediently equal to or greater than the maximum voltage of the feed d.c. voltage source 6.

From FIG. 2 it is apparent that the load 1 is formed by a high voltage transformer to which an X-ray tube is connected at the outlet side, in a non-illustrated fashion, possibly via a high voltage rectifier. The voltage of the feed d.c. voltage source 6 is adjustable for the purpose of adjusting the X-ray tube voltage.

The inverter according to FIG. 2 operates in a bridge circuit corresponding to the inverter according to FIG. 1, such that its right phase module is correspondingly constructed. Within the scope of the invention, an inverter, however, can also be constructed such that only a single phase module is present corresponding to FIG. 2, if the feed d.c. voltage source 6 has a center tap to which the right end of the load is connected.

It will be apparent that many modifications and variations may be effected without departing from the scope of the novel concepts and teachings of the present invention.

We claim as our invention:

1. An inverter comprising at least two controllable load thyristors to which a control device is connected which alternately switches them on for the purpose of alternate connection of a load to the poles of a feed d.c. voltage source, wherein there is connected, in antiparallel fashion, with each load thryistor, one diode each which is a component of a commutation installation for the corresponding load thyristor, which commutation installation manifests an LC-series oscillatory circuit dimensioned for a specified load current, and which manifests, for each load thyristor, a controllable commutation thyristor connected to the control device, whereby each commutation thyristor forms a closed circuit with the LC-series oscillatory circuit and its diode, such that the energy of the LC-series oscillatory circuit, during commutation, in each instance changes over to a low-impedance commutation path which is free of the load and of the feed d.c. voltage source, characterized in that the LC-series oscillatory circuit (11, 12) is connected via a reloading circuit (20 to 24) to an auxiliary d.c. voltage source (25) of a constant voltage, which is independent of the feed d.c. voltage source (6), and that the reloading circuit (20 through 24) limits the maximum capacitor voltage to the voltage of the auxiliary d.c. voltage source (25).

2. An inverter according to claim 1, characterized in that the voltage of the auxiliary d.c. voltage source is greater than or equal to the maximum voltage of the feed d.c. voltage source (6).

3. An inverter according to claim 1, characterized in said reloading circuit including a resistor (24) and circuit means (20-23) continuously connecting said auxiliary d.c. voltage source (25) with said LC-series oscillatory circuit (11, 12) via said resistor (24) during operation.

4. An inverter according to claim 3, wherein the LC-series oscillatory circuit is continuously connected across said auxiliary d.c. voltage source by means of the diodes (7, 8) connected in antiparallel fashion with the load thyristors (2, 3).

5. An inverter according to claim 4 with the LC-series oscillatory circuit comprising a capacitor (11) and an inductor (12), one terminal of the capacitor being connected to the auxiliary d.c. source via the resistor (24), and the other terminal of the capacitor being connected with the auxiliary d.c. source only via said inductor and the diodes (7, 8) connected in antiparallel fashion with the load thryistors (2, 3).

* * * * *